June 22, 1948.                    A. CIBULKA                    2,443,724
              APPARATUS FOR CONVERTING LIQUIDS INTO
                  GASES AND FOR DISPENSING THE GASES
                         Filed Feb. 8, 1944
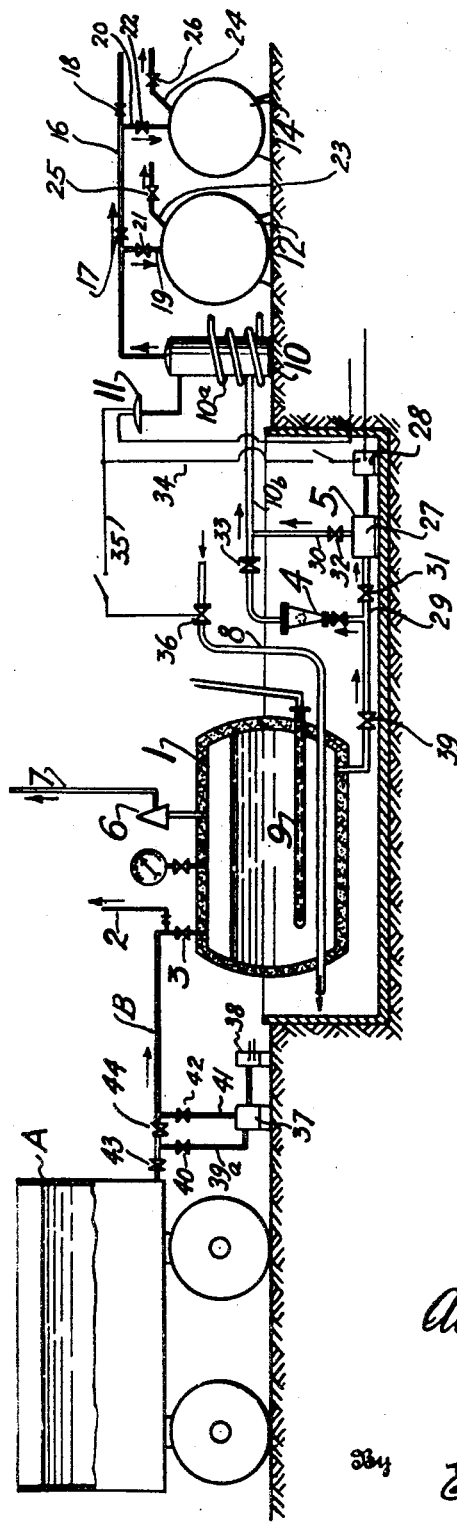
Alois Cibulka, Inventor
By E. V. Hardway, Attorney Patented June 22, 1948

2,443,724

UNITED STATES PATENT OFFICE 2,443,724

APPARATUS FOR CONVERTING LIQUIDS INTO GASES AND FOR DISPENSING THE GASES

Alois Cibulka, Highlands, Tex.

Application February 8, 1944, Serial No. 521,756

1 Claim. (Cl. 62—1)

This invention relates to an apparatus for converting liquids into gases in preparation for dispensing the gases to gas consuming devices.

The invention is particularly useful in supplying, for industrial use, gases generated from liquids of low boiling point such as oxygen, hydrogen, nitrogen, hydrocarbons and the like which are initially produced in liquid phase and transported from the place of production to the plants or industries where they are to be converted into the vapor phase for use.

It is a further object of the invention to provide apparatus by means of which the process may be cheaply and expeditiously carried out without waste.

It is a further important object of the present invention to provide equipment, for receiving the liquid and for converting the same to gas for delivery to the dispensing devices, which is of very simple construction, may be cheaply installed, which is efficient in use and which will reduce waste of the gas to a minimum.

With the above and other objects in view the invention has particular relation to certain novel features of construction, operation and arrangement of parts and to a novel process, or method, an example of which is given in this specification and illustrated in the accompanying drawing wherein the figure shows a side elevational view, partly in section and partly in diagram, of the apparatus constructed in accordance with the invention.

Referring more particularly to the drawing A designates a container for delivering the liquid at low pressure to the plant or industry at which the gas is to be used. Any kind of a container may be employed and the liquid may be delivered into the tank or vessel 1 in any preferred manner. The tank or vessel 1 may be located, at or adjacent, the plant or industry and may be permanently installed in place.

In the present illustration the container A is shown mounted on a truck for convenience in transportation and is shown connected up for delivery by means of a delivery line B which leads from the container A into the vessel 1.

The line B may be provided with a valve controlled relief line 2 through which the air may be exhausted from the delivery line B before delivery is begun. Thereupon the valve 3, of the line B, may be opened and the vessel 1 filled to any desired level and the valve 3 then closed and the container A transported to other points for making deliveries.

It is here emphasized that the liquid may be delivered to the vessel 1 in any other preferred manner than that above detailed.

The liquid in the delivery container and as initially delivered into the vessel 1 will be at comparatively low pressure.

The liquid in the vessel 1 will thereupon gasify and the vessel is equipped with a conventional safety valve 6 to prevent unsafe pressure in the vessel and leading from said safety valve there is a disposal line 7 to conduct the relieved gas to a safe place for disposal.

The conversion of the liquid in the vessel 1 to the vapor phase may be accelerated by means of a pipe 8 which is extended through the vessel 1 and through which a heating agent may be passed; or by an electric heater 9 within the vessel 1. It is to be understood that the heating means referred to are preferably submerged in the liquid in the tank or vessel 1.

The numeral 10 designates a vaporizer which, if desired, may be heated by a surrounding heater coil 10a or other selected means.

Leading from the bottom of the vessel 1 to the vaporizer there is a liquid conducting line 10b which is equipped with a conventional check valve 4. The pressure generated in the tank or vessel 1 will force the liquid through the line 10b, past the check valve 4 and on to the vaporizer.

It is to be here noted that it is more expeditious to deliver the product from the vessel in the form of liquid than in the form of gas because the latter is many times the volume of the former.

Any type of vaporizer may be employed. It converts the liquid into high pressure gas. It is equipped with a pressure regulator 11 which is provided to control the pressure in the gas system and in the storage tanks 12 and 14. High pressure gas may be delivered from the vaporizer, through the service line 16 to the consuming device. This service line is equipped with valves 17 and 18 and leading from the service line into the storage tanks 12 and 14 are the branch lines 19, 20 which are equipped with the valves 21 and 22.

The valve 17 may be closed and the valve 21 opened and the storage tank 12 may then be charged with high pressure gas. The valves 17 and 22 may be opened and the valves 18 and 21 closed and the storage tank 14 may be charged with high pressure gas; or the tanks 12 and 14 may be simultaneously charged by opening the valves 17, 21 and 22 and closing the valve 18.

The tanks 12 and 14 are also equipped with service lines 23 and 24 which are controlled by the valves 25 and 26. When it is desired to supply gas from a tank 12 or 14 to the consuming device the valve controlling its branch line should be closed and the valve controlling its service line should be opened.

A stand-by pump 27 may be employed. This pump may be driven by an electric motor 28. The pump is connected into the delivery line 10b by means of a suction line 29 and a discharge line 30. The suction line 29 is equipped with a valve 31 and the discharge line is equipped with a valve 32. These valves are opened when the pump is operating and the valve 33, of the delivery line, is closed. The delivery line also is equipped with a valve 39 which should be opened while the system is operating. The pump will now take the liquid from the vessel 1 and deliver it to the vaporizer in the required volume. The pump will usually be used when the valve 4 is taken off for repairs; however, the valve 4 may be provided as a stand-by and only used when the pump fails.

The pressure regulator 11 is also effective to close a circuit, from a suitable source of electrical energy, through the current conductor 34 to the motor 28 when the pump is in use so that the pump will operate automatically. The pressure regulator 11 is also effective to close a circuit, from the source of electrical energy, through the electrical conductor 35 to the valve 36 in the line 8 so that said valve will also be opened to supply additional heat to the liquid in the vessel 1, to accelerate vaporization, and increase in pressure, in said vessel.

There is also shown, diagrammatically, a pump 37 arranged to be driven by an electric motor 38. This pump has a suction line 39a leading from the delivery line B and equipped with the valve 40 and a discharge line 41 leading into the delivery line and equipped with valve 42. The delivery line has the valves 43 and 44 the former of which is opened during delivery and the latter of which may be closed, when the pump 37 is in operation, so that the low pressure liquid may be delivered, if desired from the container A into the vessel 1 under pump pressure.

The drawings and description are illustrative merely while the broad principle of the invention will be defined by the appended claim.

What I claim is:

Apparatus for supplying gas at a predetermined pressure comprising, a closed vessel arranged to receive liquid to be vaporized, a vaporizer, conduits leading from the vessel, beneath the level of the liquid therein, to deliver liquid to the vaporizer, a back pressure valve for controlling one of said conduits whereby the pressure in said vessel may force the liquid through the valve controlled conduit to the vaporizer, a pump connected into the other conduit whereby liquid may be pumped from said vessel to the vaporizer, manually controlled valves in said conduits for controlling the flow of the liquid by the pressure in the vessel and by the pump pressure through said conduits alternatively, a service connection leading from the vaporizer through which the vaporized gas, under pressure, may be delivered to a consuming device, or to storage, a pipe extending entirely through the vessel for conducting a heating agent and by means of which the application of heat to the liquid in the vessel may be controlled to control the pressure of the liquid being delivered through the back-pressure valve controlled conduit.

ALOIS CIBULKA.

REFERENCES CITED

The following references are of record in the file of this patent:

UNITED STATES PATENTS

| Number | Name | Date |
| --- | --- | --- |
| 1,752,165 | Ford | Mar. 25, 1930 |
| 1,935,925 | Wannack | Nov. 21, 1933 |
| 2,166,914 | Little | July 8, 1939 |
| 2,234,407 | Hoagland | Mar. 11, 1941 |
| 2,286,050 | Baker et al. | June 9, 1942 |
| 2,305,314 | Little | Dec. 15, 1942 |
| 2,322,625 | Geertz et al. | June 22, 1943 |
| 2,335,837 | Abramson | Nov. 30, 1943 |
| 2,348,546 | Kercher | May 9, 1944 |
| 2,378,077 | Garretson | June 12, 1945 |
| 2,362,984 | Boshkoff | Nov. 21, 1944 |